United States Patent
Bhalla et al.

(10) Patent No.: US 10,033,789 B2
(45) Date of Patent: Jul. 24, 2018

(54) CONNECTIONLESS WIRELESS MEDIA BROADCAST

(71) Applicant: Intel Corporation, Santa Clara, CA (US)

(72) Inventors: Himanshu Bhalla, Bengaluru (IN); Rajesh A. S, Bangalore (IN); Kristoffer D Fleming, Chandler, AZ (US); Karthik Veeramani, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/280,680

(22) Filed: Sep. 29, 2016

(65) Prior Publication Data

US 2018/0091576 A1     Mar. 29, 2018

(51) Int. Cl.
| | |
|---|---|
| *H04W 4/00* | (2018.01) |
| *H04L 29/06* | (2006.01) |
| *H04L 29/08* | (2006.01) |
| *H04W 4/80* | (2018.01) |
| *H04W 84/12* | (2009.01) |

(52) U.S. Cl.
CPC ............ *H04L 65/608* (2013.01); *H04L 67/14* (2013.01); *H04W 4/008* (2013.01); *H04W 4/80* (2018.02); *H04W 84/12* (2013.01)

(58) Field of Classification Search
None
See application file for complete search history.

(56) References Cited

U.S. PATENT DOCUMENTS

| | | | |
|---|---|---|---|
| 2006/0212911 A1* | 9/2006 | MacMullan | H04N 5/38 725/81 |
| 2010/0220977 A1* | 9/2010 | Kwon | G11B 20/00086 386/252 |
| 2013/0060956 A1* | 3/2013 | Nagaraj | H04N 21/4384 709/231 |
| 2013/0170482 A1 | 7/2013 | Jung | |
| 2013/0223539 A1 | 8/2013 | Lee et al. | |
| 2014/0079043 A1* | 3/2014 | Montemurro | H04W 52/0216 370/338 |
| 2014/0325554 A1* | 10/2014 | Park | H04N 21/25816 725/31 |
| 2014/0351445 A1 | 11/2014 | Davidson et al. | |

(Continued)

OTHER PUBLICATIONS

"International Application Serial No. PCT/US2017/049073, International Search Report dated Dec. 11, 2017", 3 pgs.

(Continued)

*Primary Examiner* — Rebecca E Song
(74) *Attorney, Agent, or Firm* — Schwegman Lundberg & Woessner, P.A.

(57) ABSTRACT

A method for executing a connectionless wireless media content session includes receiving a MAC address by an electronic device. The MAC address may be received out-of-band. The address is monitored for received media content over a wireless channel from a transmitter. The broadcast wireless channel and media content codec information may also be received out of band. The received media content is received over a Wi-Fi MAC layer using RTP without an IP connection with the transmitter. The received media content may be rendered on the electronic device.

18 Claims, 4 Drawing Sheets

(56) References Cited

U.S. PATENT DOCUMENTS

| | | | |
|---|---|---|---|
| 2014/0355585 A1 | 12/2014 | Sadeghi et al. | |
| 2015/0092233 A1* | 4/2015 | Park ...................... | G06F 3/1288 358/1.15 |
| 2015/0099502 A1* | 4/2015 | Park ....................... | H04W 4/16 455/418 |
| 2015/0172757 A1* | 6/2015 | Kafle .................. | H04L 67/1044 725/81 |
| 2015/0327313 A1* | 11/2015 | Kim ..................... | H04W 80/10 370/329 |
| 2015/0350288 A1* | 12/2015 | Verma .............. | H04N 21/43637 709/219 |
| 2015/0350346 A1* | 12/2015 | Fujita ................... | H04W 4/008 709/224 |
| 2015/0370915 A1 | 12/2015 | Kim | |

OTHER PUBLICATIONS

"International Application Serial No. PCT/US2017/049073, Written Opinion dated Dec. 11, 2017", 9 pgs.

\* cited by examiner ic # CONNECTIONLESS WIRELESS MEDIA BROADCAST

TECHNICAL FIELD

Embodiments described herein pertain in general to wireless networks and in particular to providing broadcast of media over Wi-Fi in a connectionless manner.

BACKGROUND

Broadcasting media content to an audience may have many attractive uses. For example, an instructor broadcasting educational media content to students in a classroom or a sporting event stadium broadcasting up close game play or reruns of game play to the spectators.

It may be difficult to broadcast media content to many users in a Wi-Fi environment. For example, streaming media content from the Internet using Hypertext Transfer Protocol (HTTP) or similar methods involves a transmitter unicasting to each receiver. This may be inefficient in terms of bandwidth when the usage is limited to broadcasting within a confined space. Also, multicasting over Internet Protocol (IP) infrastructure (e.g., multicast backbone (MBONE)) may address the bandwidth inefficiency in the multicasting example but this method ties each user to an access point (AP). In other words, each user wishing to receive the broadcast media content has to connect to and configure credentials for an AP and may require complex network of AP as well as IP layer network switches/routers.

DETAILED DESCRIPTION

In a conventional Wi-Fi local area network (LAN), user equipment (UE) needs to be connected to the LAN through an access point (AP) or some other connection to the network. The UE executes a connection protocol (e.g., IEEE 802.11) to connect to the LAN through the AP. For a large number of users (e.g., classroom size, stadium size), this may be unduly burdensome on the users as well using a relatively large amount of time to connect everyone to the network.

These challenges, as well as others, may be overcome using Wi-Fi beacons to multicast media content to electronic devices (e.g., UEs) able to receive the beacons in a connectionless manner. Using Delivery Traffic Indication Map (DTIM) messages in the Wi-Fi beacons, media content may be multicast to electronic devices (e.g., UEs) within range of the transmitters. The media content may be packetized using a transmission standard (e.g., Miracast) with real-time transport protocol (RTP) packets carrying Moving Picture Experts Group transport stream (MPEG2-TS) payloads. The RTP+TS data may be carried within media access control (MAC) frames using this approach.

An Internet Protocol (IP) layer is not present and, thus, a conventional Wi-Fi AP is not necessary since the AP connection protocol is not used (e.g., connectionless). The media content may be transmitted, from a radio transmitter (e.g., base station), to a receiver of any electronic device within range of the base station without requiring a connection between the base station and the electronic device.

As used herein, the term broadcasting may be defined as transmitting information from one transmitter to a set of receivers. Multicasting may be defined as transmitting the information from one or more transmitters to the set of receivers. These terms may be used interchangeably herein since the method for connectionless wireless media operates equally well in either scenario. In other words, the connectionless wireless media may be transmitted from one central transmitter in a relatively smaller area (e.g., classroom) or from a plurality of transmitters in a relatively larger area (e.g., stadium).

Figure 1:
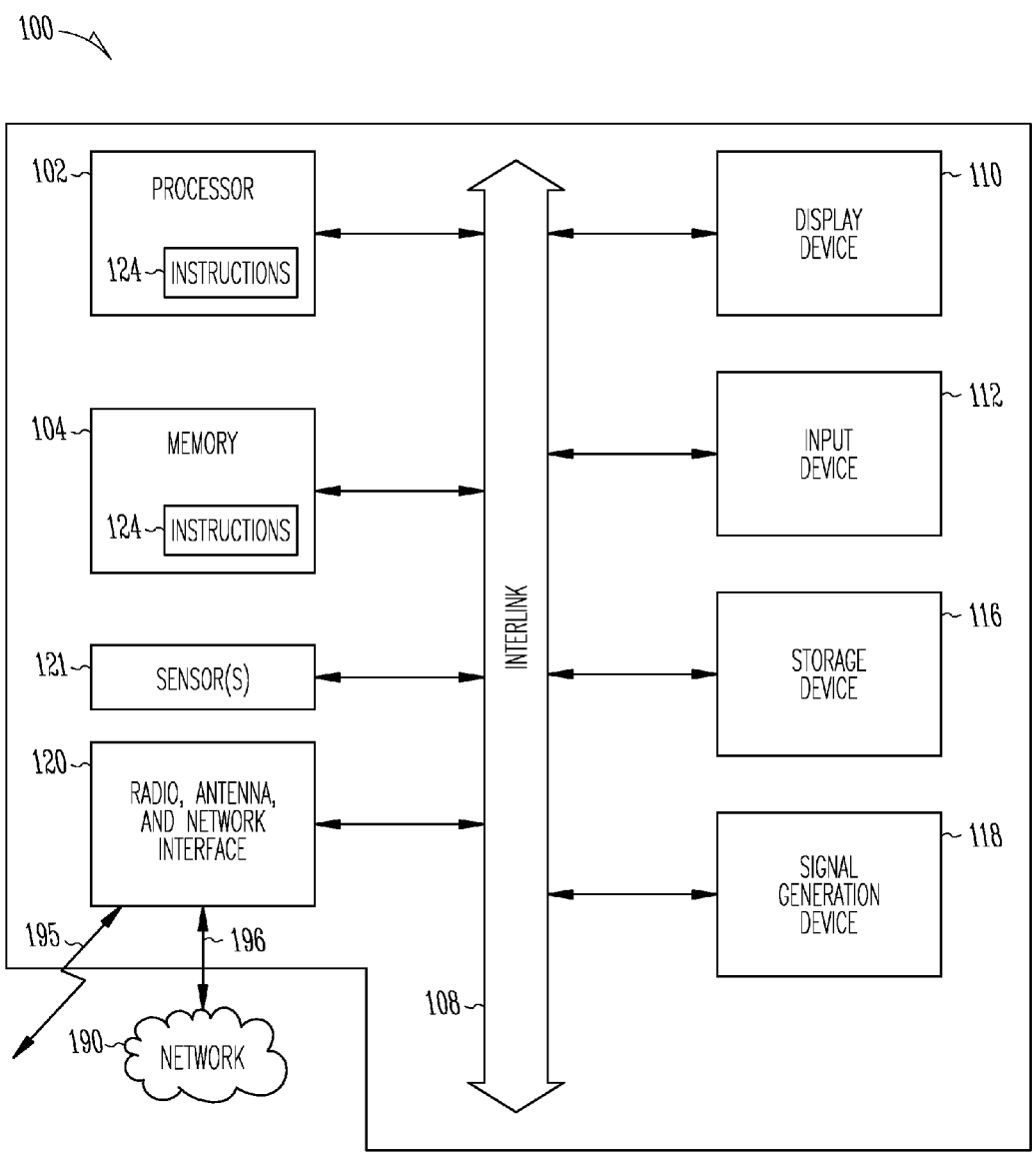
FIG. 1 illustrates a block diagram of a wireless station, according to various embodiments.

FIG. 1 illustrates an example of a wireless station 100, according to various embodiments. The wireless station 100 may be the electronic device (e.g., UE) for receiving multicast media content and executing a connectionless wireless media session. The wireless station 100 may also be a broadcast controller for broadcasting the multimedia content over a wireless channel 195. The wireless station 100 may also be referred to as a computer to execute any methods disclosed herein. This block diagram is for purposes of illustration only as other wireless stations 100 may have different architectures and still be able to transmit or receive multimedia content.

The wireless station 100 may include a processor 102 (e.g., a central processing unit (CPU), a graphics processing unit (GPU), a hardware processor core, or any combination thereof) and memory 104. The various elements of the wireless station 100 may communicate with each other over an interlink (i.e., bus) 108.

The wireless station 100 may further include a display device 110 and an input device 112 (e.g., a keypad, keyboard, microphone) coupled to the interlink 108. In an example, the display device 110 and the input device 112 together may be a touchscreen display. For example, the touchscreen display may be incorporated into the wireless station 100 configured as a UE including a tablet computer, smartphone device, personal electronics, or other such electronic device.

The wireless station 100 may additionally include a storage device (e.g., flash memory, random access memory (RAM), read only memory (ROM), magnetic disk drive, optical disk drive) 116, a signal generation device 118 (e.g., a speaker), a radio, antenna, and network interface 120, and one or more sensors 121 all coupled to the interlink 108.

The sensors 121 may include imaging sensors for generating a video signal, sensors for scanning a Quick Response (QR) code, or other types of sensors. The radio, antenna, and network interface 120 may use any communication standard for communicating over the wireless channel 195 with another wireless station 100 or over another channel (e.g., wireless, wired) 196 with a network 190.

The radio 120 includes both radio frequency (RF) transmitters and receivers and may operate using one or more of a Bluetooth® standard, an IEEE 802.11 standard, near-field communication (NFC) standard, or any other standard for communicating over a wireless 195 or channel 196. The network 190 may be a peer-to-peer network, a local area network (LAN), or a wide area network (WAN) including the Internet.

The memory 104 may include at least one transitory or non-transitory computer-readable medium on which is stored one or more sets of data structures or instructions 124 (e.g., software) embodying or utilized by any one or more of the techniques, methods, or functions described herein for the electronic device to perform a connectionless wireless media session. The instructions 124 may also reside, at least partially, in additional computer-readable memories such as within the processor 102 during execution thereof by the wireless station 100. In an example, one or any combination of the processor 102, the memory 104 or the storage device 116 may constitute non-transitory computer-readable media.

Figure 2:
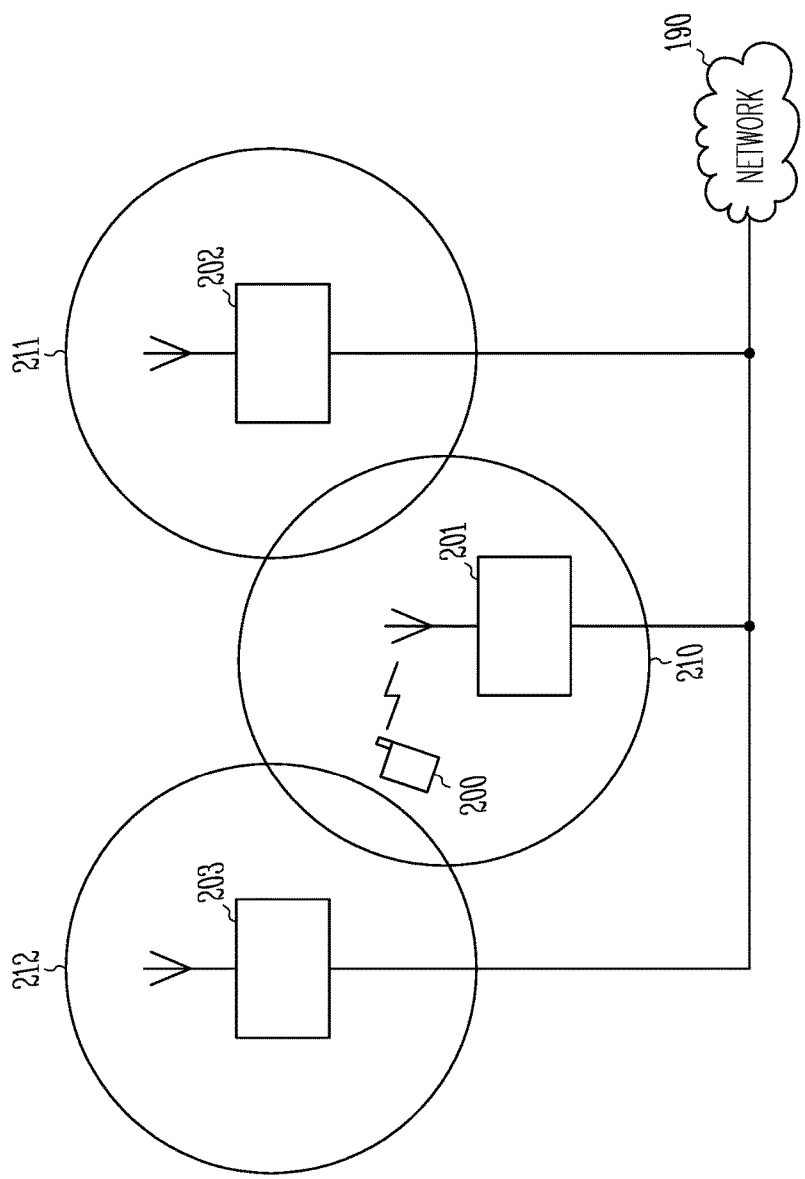
FIG. 2 illustrates a diagram of a wireless communication network including a plurality of wireless stations communicating over wireless channels, according to various embodiments.

FIG. 2 illustrates a diagram of a wireless communication network (e.g., Wi-Fi network) including a plurality of wireless stations 200-203 communicating over wireless channels, according to various embodiments. For example, the wireless communication network includes a network that conforms to the Institute of Electrical and Electronic Engineers (IEEE) 802.11x standards. The wireless communication network includes the plurality of wireless stations 200-203 that may include a wireless electronic device (e.g., UE) 200 and a plurality of base stations 201-203 that may communicate over one or more wireless channels.

For purposes of illustration, the functional block diagram of FIG. 1 may represent any of the wireless stations 200-203. In other embodiments, the wireless stations 200-203 may be represented by other functions or components.

The wireless electronic device 200 may be any mobile computing device having a wireless communication capability that may be either stationary or non-stationary. Such a computing device may include smart telephones, tablet computers, lap top computers, and other computing devices that have the ability to communicate with the base stations 201-203 over one or more wireless channels using one or more communication techniques.

The base stations 201-203 may have fixed locations. The base stations 201-203 may be part of a stationary network that may be coupled to a larger network 190. For example, the base stations 201-203 may be part of a wired network that is coupled to the Internet 190. The wireless electronic device 200 may then access the larger network 190 by communicating over the wireless communication channels with one or more of the base stations 201-203.

The signal transmission from the base stations 201-203 may form basic service areas (BSA) or cells 210-212 around the base stations 201-203. When the wireless electronic device 200 is within communication distance of a particular base station 201-203, it may be assumed to be within one of the cells 210-212. For example, FIG. 2 shows the wireless electronic device 200 to be within a cell 210 created by the base station 201.

Figure 3:
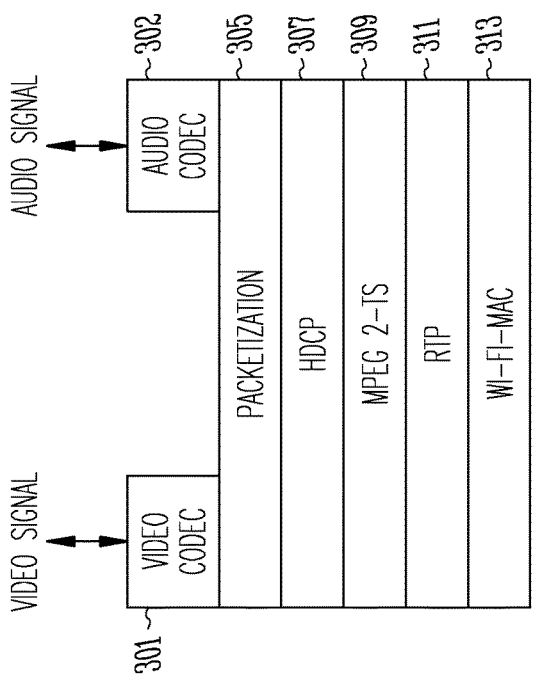
FIG. 3 illustrates a diagram of an architecture for connectionless wireless media content multicasting, according to various embodiments.

FIG. 3 illustrates a diagram of an architecture for connectionless wireless media content broadcasting (e.g., media content session), according to various embodiments. The architecture illustrated in FIG. 3 is non-limiting in that the functions of a particular layer may be combined or distributed with one or more other layers, and the arrangement of the layers may be conceptualized differently.

The architecture is described in terms of transmitting a signal from a source transmitter such that the source transmitter comprises this architecture. However, the electronic devices communicating with the transmitter during the connectionless wireless media content session may also have the same architecture where the received signal transitions the architecture in a reverse order from the transmitter.

The video codec layer 301 represents an electronic circuit and/or software that compresses or decompresses a video signal. This layer 301 converts raw (e.g., uncompressed) digital video to a compressed format or vice-versa.

For example, a video signal may be digitized and input to the video codec layer 301 as video data. In another embodiment, compressed video data may be decompressed and output from the video codec layer 301 as raw video data.

The video codec layer 301 may use a common, standard video compression/decompression format to make it compatible with other devices. For example, video created with a standard MPEG-4 Part 2 codec such as XVID may be decoded (e.g., played back) using any other standard MPEG-4 Part 2 codec such as FFmpeg MPEG-4 or DivX Pro Codec since they all use the same video format. Other types of video codecs may include: H.265/MPEG-H HEVC, H.264/MPEG-4 AVC, QuickTime H.264, Nero Digital, DivX Pro, or H.263/MPEG-4 Part 2.

The audio codec layer 302 represents an electronic circuit and/or software that codes or decodes a digital data stream audio signal. If implemented as software, the audio codec layer 302 is a computer program implementing an algorithm that compresses and decompresses digital audio data according to a given audio file or streaming media audio coding format. The objective of the algorithm is to represent the high-fidelity audio signal with minimum number of bits while retaining the quality. This may effectively reduce the storage space and the bandwidth required for transmission of the stored audio file. The audio codec layer 302 may be implemented as a library that interfaces to one or more multimedia players.

If implemented as hardware, the audio codec layer 302 represents a device that encodes analog audio as a digital signal and decodes digital data back into the original analog signal. In other words, it contains both an analog-to-digital converter (ADC) and digital-to-analog converter (DAC) running off the same clock.

Examples of audio codec standards may be lossless standards such as: Apple Lossless Audio Codec (ALAC), Free Lossless Audio Codec (FLAC), OptimFROG (OFR), Windows Media Audio Lossless (WMAL), Dor WavPack (WV). Examples of lossy audio codec standards may include: Adaptive Differential Pulse Code Modulation (ADPCM), Direct Stream Transfer (DTS) Coherent Acoustics, MPEG-1, or MPEG-2 Audio.

The video and audio codecs 301, 302 are next to a packetization layer 305 (e.g., packetized elementary stream (PES) packetization) in the architecture of FIG. 3. The PES packetization layer 305 represents a specification in the MPEG-2 Part 1 that defines the carrying of elementary streams (i.e., the output of an audio or video decoder containing one kind of data (audio or video)) from the audio or video codecs 301, 302 in packets within MPEG program streams or MPEG transport streams. The elementary stream is packetized by encapsulating sequential data bytes from the elementary stream inside PES packet headers. The packetization layer 305 may also take packetized data and convert the packets to data signals for use by the video and audio codecs 301, 302.

For example, the elementary stream data from the video or audio codec layers 301, 302 may be transmitted by creating PES packets from the elementary stream data and then encapsulating these PES packets inside Transport Stream (TS) packets or Program Stream (PS) packets. The TS packets may then be multiplexed and transmitted using broadcasting techniques. In the case of a transmitted signal, the packetization layer 305 may generate compressed audio and video signals to be decompressed by the codecs 301, 302.

The packetization layer 305 is next to a High-bandwidth Digital Content Protection (HDCP) layer 307 (e.g., HDCP 2.X). The HDCP layer 307 provides a form of digital copy protection to media content being transmitted. The HDCP layer 307 encrypts the data (e.g., audio, video) being transmitted using encryption keys exchanged from an out-of-band mechanism.

The HDCP layer 307 may use a plurality of sub-systems: authentication, encryption, and key revocation. The authentication prevents non-licensed devices from receiving the multicast media content. The encryption of the transmitted audio or video data prevents eavesdropping of transmitted data. The key revocation prevents devices that have been compromised and cloned from receiving data.

Each HDCP-capable electronic device has a unique set of encryption keys that are received out-of-band. In other words, the encryption keys may be received by the electronic device over an email connection, a text message, a preconfigured server address, a Bluetooth channel, an NFC channel, a QR code, manual entry by a user, or some other means for entering the keys. For example, a user may tap their electronic device on an NFC hotspot prior to a broadcast to receive both the encryption keys and a preconfigured broadcast address from the system that will transmit the media content. In another embodiment, this information may be exchanged over a known Wi-Fi channel. In yet another embodiment, a smartphone app may be programmed with a uniform resource locator (URL) to retrieve the address using hypertext transfer protocol/representational state transfer (HTTP/REST) type protocols.

A special public key (i.e., Key Selection Vector (KSV)) may then be created for each set of keys. Each KSV may include one bit for each HDCP key (e.g., 40 bits).

During authentication, the electronic device and the network exchange their KSVs. Each device adds its own secret keys together (e.g., using unsigned addition modulo 256) according to a KSV received from the network. Depending on an order of bits set to logical "1" in the KSV, a corresponding secret key is used or ignored. The generation of keys and KSVs gives both the electronic device and the network the same 56-bit key that may be used later to encrypt video and/or audio data.

Wireless channel encryption may be performed by a stream cipher. Each decoded pixel is encrypted by applying an exclusive-OR (XOR) operation with a 24-bit number produced by a generator.

An MPEG2-TS layer 309 is next to the HDCP layer 307. The MPEG2-TS layer 309 represents a standard digital container format for transmission and storage of audio and video data. The transport stream specifies a container format encapsulating packetized elementary streams. The stream may include error correction and stream synchronization features for maintaining transmission integrity. The MPEG2-TS layer 309 also converts MPEG2 packets to a packetized data stream for the packetization layer 305.

A Real-time Transport Protocol (RTP) layer 311 is next to the MPEG2-TS layer 309. The RTP layer 311 represents a network protocol for delivering audio and video over IP networks. The RTP layer 311 is modified to communicate directly over the following Wi-Fi Media Access Control (MAC) layer 313 instead of the conventional approach of going through an Internet Protocol (IP) layer. Thus, in the illustrated embodiment, the audio/video payload interfaces directly with the MAC layer 313 and the IP layer is not present. This is illustrated and discussed subsequently with reference to the stream output of FIG. 4.

The architecture illustrated in FIG. 3, from the RTP layer 311 up to the video and audio codecs 301, 302, may be referred to as an audio/video payload. The AN payload interfaces directly with the Wi-Fi MAC layer 313.

The MAC layer 313 provides addressing and channel access control mechanisms that make it possible for a plurality of electronic devices or network nodes to communicate within a multiple access network that incorporates the broadcast media. The MAC layer 313 acts as an interface between a logical link control (LLC) sublayer and a network's physical layer. The MAC layer 313 emulates a full-duplex logical communication channel in a multi-point network.

In order for an electronic device (e.g., UE) to receive the broadcast media content over the MAC layer, the device monitors a preconfigured multicast MAC address that tells the Wi-Fi driver to read data received at that multicast MAC address. Electronic device users may launch an application on the device that has the preconfigured address already stored or knows where to retrieve the address (e.g., World Wide Web site, dedicated server). The preconfigured address may also be received from the network over an email connection, a text message, a Bluetooth channel, an NFC channel, manual entry by a user, or some other means for receiving the preconfigured address.

The MAC layer 313 is broadcast at one or more known frequencies that preclude the need for packet switching at the network layer (e.g., IP layer). The one or more frequencies may be different than conventional IEEE 802.11 frequencies (e.g., 2.4 GHz, 3.6 GHz, 4.9 GHz, 5 GHz, and 5.9 GHz). A transmitter may transmit the multicast signal that may be amplified by the use of radio frequency (RF) repeaters to cover a relatively large area (e.g., stadium). Since the repeaters operate at the RF layer (i.e., no packet switching), the expected latency from the source transmitter to the receiving electronic devices may be minimal. As the RF repeaters receive and re-transmit each frame on the same RF channel, the number of frames on that particular channel may be doubled.

The transmitter broadcasts Wi-Fi beacons. A Wi-Fi beacon may be defined as a management frame defined in the IEEE 802.11 standards. Each Wi-Fi beacon frame contains information about the network (e.g., wireless local area network (WLAN)) from which it is being transmitted. Beacon frames may be transmitted periodically to announce the presence of the WLAN and synchronize the message transmission. Wi-Fi beacon frames are conventionally transmitted by Access Points (APs) in an infrastructure Basic service set (BSS). However, since the method for connectionless wireless media broadcast does not need to use APs, the MAC layer transmits the Wi-Fi beacon frames. The Wi-Fi beacon frames are transmitted with Delivery Traffic Indication Map (DTIM) messages that indicate the availability of multicast traffic at the preconfigured address. The A/V payload that is being streamed may be split across a plurality of the DTIM messages.

The DTIM messages may be defined as messages comprising a traffic indication map (TIM) that informs the electronic devices about the presence of buffered multicast/broadcast data on the MAC layer. The messages are generated within the periodic Wi-Fi beacons at a frequency specified by a DTIM Interval. TIMs that are present in every beacon are for signaling the presence of the buffered multicast/broadcast data. After a DTIM, the MAC layer sends the multicast/broadcast data on the channel following the normal channel access rules.

Because the connectionless wireless media broadcast method does not use APs, the Wi-Fi band is less crowded and any APs already present in the area may be used for other uses than the broadcast media.

A receiver in an electronic device that does not wish to receive the multicast messages may ignore the data at the preconfigured address. Such a device may enter a lower power state so that it does not waste power processing these messages.

A receiver in an electronic device that is interested in receiving the multicast messages processes the multicast traffic from the preconfigured address. The processing includes parsing the RTP and TS headers of the traffic, decoding the audio and/or video data, and rendering the decoded data on a display and/or speaker of the electronic device. Details of such an operation are described subsequently with reference to FIGS. 4 and 5.

Figure 4:
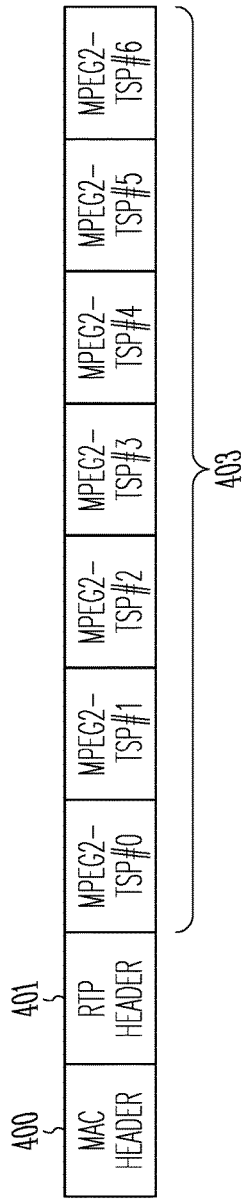
FIG. 4 illustrates a stream output from a source codec, according to various embodiments.

FIG. 4 illustrates a stream output from a source codec (e.g., video codec 301 or audio codec 302), according to various embodiments. The stream is for purposes of illustration as it may include other elements that are not shown. For example, error detection/correction bits may be attached to the stream.

The stream includes a MAC header 400, an RTP header 401, and a payload portion 403 that comprises a plurality of packetized video and audio data (e.g., MPEG2-TSP#0-MPEG2-TSP#6). For example, the plurality of packets 403 may be in the illustrated MPEG2 format, from an MPEG standard codec, or some other format from a different standard of codec. As known in the art, each of the plurality of MPEG packets 403 also includes an identifying header portion along with the data.

Since the stream is broadcast in a connectionless manner (e.g., without AP connection protocols), the stream begins with the MAC header 400 and the RTP header 401 instead of the conventional stream of packets with the RTP, user datagram protocol (UDP), IP, and MAC headers. Thus, the present method removes the IP and UDP headers and streams directly over MAC using RTP.

The RTP header 401 includes an indication of a time stamp (e.g., 32 bit) that may be derived from a synchronized clock source. The RTP header 401 further includes an indication of a time of arrival of the transport stream packet #0 (TSP#0).

Figure 5:
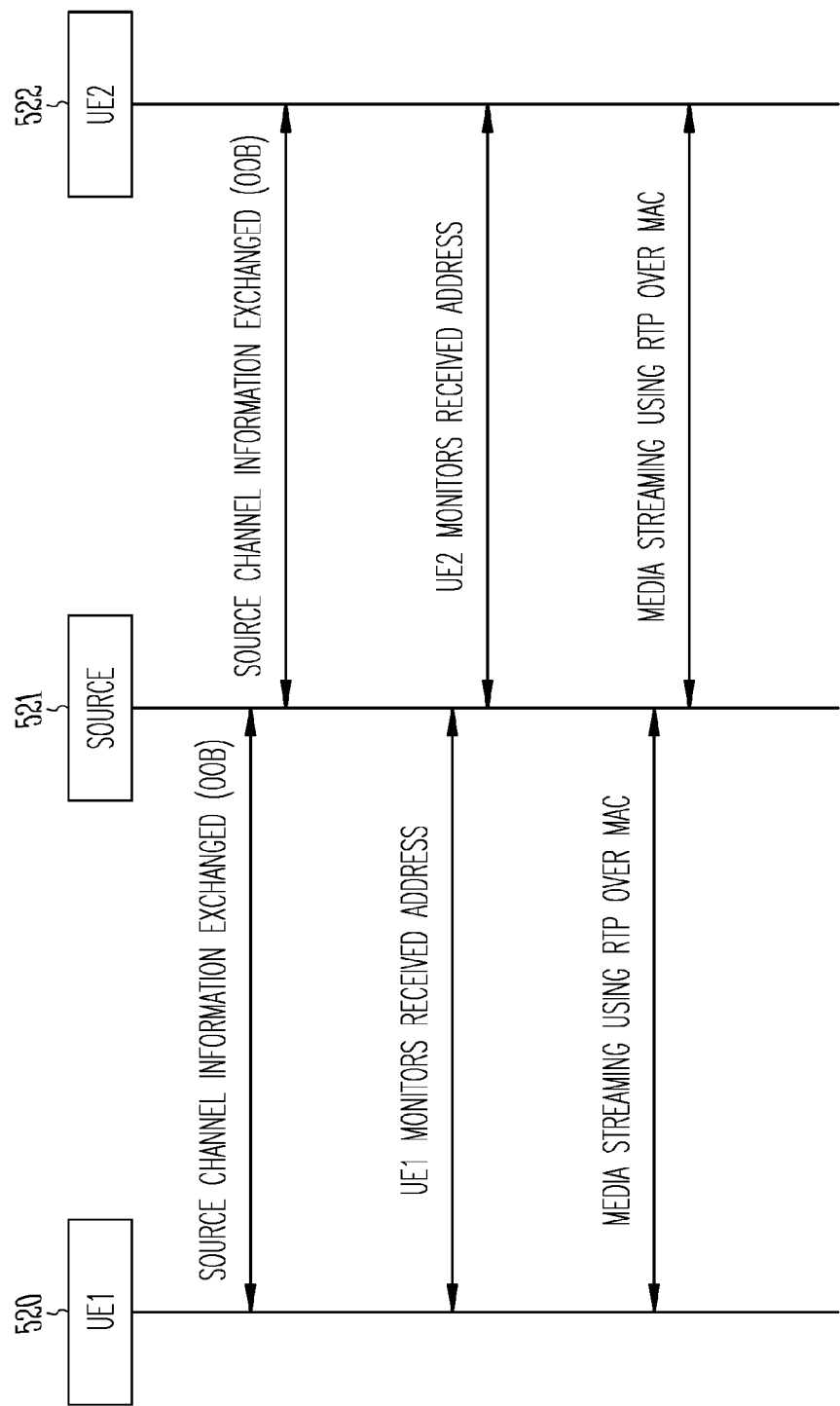
FIG. 5 illustrates a flow diagram of a method of operation of the connectionless wireless media content broadcasting, according to various embodiments.

FIG. 5 illustrates a flow diagram of a method of operation of the connectionless wireless media content broadcasting, according to various embodiments. For purposes of brevity and clarity, the flow diagram is shown between a source transmitter 521 and two electronic devices (e.g., UE1, UE2) 520, 522. However, as discussed previously, a system may have a substantially larger number of electronic devices (e.g., thousands) and the media content may be multicast using more than one source. The UEs 520, 522 are used to represent any electronic device having a radio and able to communicate over a wireless channel with the source transmitter 521.

The source transmitter 521 may be coupled to a network (e.g., Internet, local area network (LAN), wide area network (WAN)). A controller on the network (e.g., see FIG. 1) that is coupled to the source transmitter 521 provides the data stream for transmission by the source transmitter 521.

Initially, source channel information (e.g., preconfigured multicast MAC address, broadcast frequency, codec parameters) is exchanged out-of-band (OOB) 501, 503 between the source transmitter 521 and the UEs 520, 522. This exchange may occur through an email, a text message, a Bluetooth connection, an NFC hotspot, scanning of a QR code (e.g., embedded in the QR code printed on a ticket or email), or pre-stored in an application being executed on the electronic device. The source channel information may also be exchanged over a known Wi-Fi channel.

The source channel information may include the receipt of the preconfigured address from the network, the radio frequency at which the broadcast is to occur, codec parameters used by the audio and/or video codecs. The UE codecs may then use these codec parameters while decoding the media content received over the streaming channel. In an embodiment, the UEs 520, 522 may respond with some proprietary message to the network. For example, the UEs 520, 522 may send encryption information to the network so that the link between the source transmitter 521 and the UEs 520, 522 may be encrypted. The source channel information may also be exchanged in-band as well. For example, an RTP extension header may contain this information.

The UEs 520, 522 then "tune" to the source channel 505, 507. This may be accomplished by each UE 520, 522 incorporating the preconfigured MAC address into an application executing on the UE 520, 522.

The source 521 provides media streaming using RTP over MAC 509, 511 without an IP connection to the Wi-Fi network. The UEs 520, 522 may monitor the preconfigured MAC address for incoming streaming data 509, 511. The UE may also create or maintain an IP connection to the Wi-Fi network for services other than the media content session.

Because the rendering capabilities of each of the electronic devices receiving the multicast media content may differ, the data stream may be modified to include data packets targeted for different electronic device capabilities so that the receiving electronic device may take advantage of its rendering capabilities. For example, some electronic devices may be able to render 1080P video while other devices may be able to render 4 k video. Similarly, some devices may be stereo-capable while other devices may only have a single speaker to render mono-audio content. To take into account each of these rendering differences, the data stream may be layered or a different stream may be transmitted at a different broadcast frequency.

The data stream layering may be accomplished by adaptive encoding of the digitized audio and video signals. The adaptive encoding provides different encoded packets within a single data stream that are meant for different electronic devices. For example, one set of packets in the stream may be meant for an electronic device with a 4 k video capability while another set of packets in the stream may be meant for an electronic device with a 1080P video capability. The different packet sets may be differentiated by packet headers so that each electronic device may decode only those respective packets meant for the capabilities of that particular electronic device. The electronic device may then choose one of the sets of packets based on the capabilities of the electronic device.

The source may also transmit a plurality of different data streams at different frequencies. Each electronic device may then "tune" to the particular frequency associated with the capabilities of the respective electronic device. For example, the source may stream 1080P media content at frequency "x" while also streaming 4 k media content at frequency "y". An app executing on the electronic devices may be informed of the appropriate frequency to monitor in order to receive and decode only that stream meant for the capabilities of the respective device.

ADDITIONAL NOTES & EXAMPLES

Example 1 is an electronic device to execute a connectionless wireless media content session, the device comprising: a radio to receive media content over a wireless channel from a Wi-Fi network; memory to store instructions for performing the connectionless wireless media content session without an Internet Protocol (IP) connection to the Wi-Fi network; and a controller, coupled to the memory and the radio, to execute the instructions to receive a media access control (MAC) address and monitor the address for the media content received over the wireless channel using real-time transport protocol (RTP) over a Wi-Fi MAC layer without an IP connection to the Wi-Fi network.

In Example 2, the subject matter of Example 1 optionally includes wherein the controller is further to receive the address over a channel other than a Wi-Fi frequency.

In Example 3, the subject matter of Example 2 optionally includes wherein the controller is further to receive the address over an email connection, a preconfigured server address, a text message, a Bluetooth channel, a near-field communication (NFC) channel, or scanning of a Quick Response code.

In Example 4, the subject matter of any one or more of Examples 1-3 optionally include wherein the media content received over the wireless channel comprises Moving Picture Experts Group transport stream (MPEG2-TS) payloads.

In Example 5, the subject matter of Example 4 optionally includes wherein the media content comprises a packetized data stream including a MAC header, an RTP header, and a plurality of MPEG2-TS packets.

In Example 6, the subject matter of any one or more of Examples 1-5 optionally include wherein the radio is configured to receive the Wi-Fi signal from a plurality of network transmitters.

In Example 7, the subject matter of any one or more of Examples 2-6 optionally include wherein the controller is further configured to create or maintain an IP connection for services other than the media content session.

In Example 8, the subject matter of any one or more of Examples 1-7 optionally include wherein the controller is further configured to use a High-bandwidth Digital Content Protection (HDCP) layer to decrypt the packetized data stream.

In Example 9, the subject matter of any one or more of Examples 1-8 optionally include a display and a signal generation device for rendering the media content.

Example 10 is a method for a connectionless wireless media content session, the method comprising: receiving a MAC address by an electronic device; monitoring the address for received media content over a wireless channel from a transmitter, wherein the received media content is received over a Wi-Fi MAC layer using RTP without an IP connection with the transmitter; and rendering the received media content on the electronic device.

In Example 11, the subject matter of Example 10 optionally includes wherein receiving the address comprises receiving the address over a channel that is not a Wi-Fi channel.

In Example 12, the subject matter of Example 11 optionally includes wherein receiving the address comprises receiving the address from one of an email, a text message, a preconfigured server address, a Bluetooth channel, a near-field communication (NFC) channel, or scanning of a QR code.

In Example 13, the subject matter of any one or more of Examples 10-12 optionally include prior to rendering the received media content: generating a packetized data stream from the received media content, wherein the received media content comprises an MPEG2-TS stream; generating compressed audio and video signals from the packetized data stream; and decompressing the compressed audio and video signals to generate raw audio and video signals for rendering on the electronic device.

In Example 14, the subject matter of any one or more of Examples 10-13 optionally include receiving a MAC header, an RTP header, and a plurality of MPEG2-TS packets.

In Example 15, the subject matter of any one or more of Examples 10-14 optionally include receiving the MAC address over a Wi-Fi channel.

In Example 16, the subject matter of any one or more of Examples 10-15 optionally include receiving a layered data stream having a plurality of sets of packets; and choosing one of the plurality of sets of packets based on the capabilities of the electronic device.

In Example 17, the subject matter of any one or more of Examples 10-16 optionally include receiving a respective data stream from each of a plurality of wireless channels, each channel having a different frequency; and decoding one of the respective data streams based on the capabilities of the electronic device.

Example 18 is at least one computer-readable medium comprising instructions for executing a connectionless wireless media content session, when executed by a computer, cause the computer to perform any one of the method Examples 10-17.

Example 19 is an apparatus comprising means for performing any of the methods of Examples 10-17.

Example 20 is at least one computer-readable medium comprising instructions for executing a connectionless wireless media content session in an electronic device that, when executed by a computer, cause the computer to: receive a MAC address; monitor the MAC address for received media content over a wireless channel from a network transmitter, wherein the received media content is received over a Wi-Fi MAC layer using RTP without an IP connection with the transmitter; and render the received media content on an electronic device.

In Example 21, the subject matter of Example 20 optionally includes wherein the instructions further cause the computer to decode packets from a modified data stream based on capabilities of the electronic device, the data stream modified to include sets of data packets, each set targeted for different electronic device capabilities.

In Example 22, the subject matter of any one or more of Examples 20-21 optionally include wherein the instructions further cause the computer to monitor one of a plurality of frequencies based on capabilities of the electronic device.

In Example 23, the subject matter of any one or more of Examples 20-22 optionally include wherein the instructions further cause the computer to read the MAC address embedded in an email, a text message, or a QR code.

In Example 24, the subject matter of any one or more of Examples 20-23 optionally include wherein the instructions further cause the computer to receive the MAC address from an NFC hotspot or a Bluetooth connection.

In Example 25, the subject matter of any one or more of Examples 20-24 optionally include wherein the instructions further cause the computer to receive Wi-Fi beacon frames that are transmitted with Delivery Traffic Indication Map (DTIM) messages indicating the availability of multicast traffic at the MAC address.

Example 26 is an electronic device to execute a connectionless wireless media content session, the device comprising: means for receiving a MAC address by an electronic device; means for monitoring the address for received media content over a wireless channel from a transmitter, wherein the received media content is received over a Wi-Fi MAC layer using RTP without an IP connection with the transmitter; and means for rendering the received media content on the electronic device.

In Example 27, the subject matter of Example 26 optionally includes wherein the means for receiving the address comprises means for receiving the address over a channel that is not a Wi-Fi channel.

In Example 28, the subject matter of Example 27 optionally includes wherein the means for receiving the address comprises means for receiving the address from one of an email, a text message, a Bluetooth channel, a near-field communication (NFC) channel, or means for scanning of a Quick Response code.

In Example 29, the subject matter of any one or more of Examples 26-28 optionally include means for generating a packetized data stream from the received media content, wherein the received media content comprises an MPEG2-TS stream; means for generating compressed audio and video signals from the packetized data stream; and means for decompressing the compressed audio and video signals to generate raw audio and video signals for rendering on the electronic device.

In Example 30, the subject matter of any one or more of Examples 26-29 optionally include means for receiving a MAC header, an RTP header, and a plurality of MPEG2-TS packets.

In Example 31, the subject matter of any one or more of Examples 26-30 optionally include means for receiving the MAC address over a Wi-Fi channel.

In Example 32, the subject matter of any one or more of Examples 26-31 optionally include means for receiving a layered data stream having a plurality of sets of packets; and means for choosing one of the plurality of sets of packets based on the capabilities of the electronic device.

In Example 33, the subject matter of any one or more of Examples 26-32 optionally include means for receiving a respective data stream from each of a plurality of wireless channels, each channel having a different frequency; and means for decoding one of the respective data streams based on the capabilities of the electronic device.

Example 34 is a system to execute a connectionless wireless media content session, the system comprising: a radio to transmit media content over a wireless channel in a Wi-Fi network; memory to store instructions for performing the connectionless wireless media content session without an Internet Protocol (IP) connection to the Wi-Fi network; and a controller, coupled to the memory and the radio, to execute instructions to transmit a media access control (MAC) address to user equipment and transmit the media content at the address over the wireless channel using real-time transport protocol (RTP) over a Wi-Fi MAC layer without an IP connection to the Wi-Fi network.

In Example 35, the subject matter of Example 34 optionally includes wherein the controller is further to transmit the address over a channel other than a Wi-Fi frequency.

In Example 36, the subject matter of Example 35 optionally includes wherein the controller is further to transmit the address over an email connection, a preconfigured server address, a text message, a Bluetooth channel, a near-field communication (NFC) channel, or scanning of a Quick Response code.

In Example 37, the subject matter of any one or more of Examples 34-36 optionally include wherein the media content transmitted over the wireless channel comprises Moving Picture Experts Group transport stream (MPEG2-TS) payloads.

In Example 38, the subject matter of Example 37 optionally includes wherein the media content comprises a packetized data stream including a MAC header, an RTP header, and a plurality of MPEG2-TS packets.

In Example 39, the subject matter of any one or more of Examples 34-38 optionally include wherein the radio is configured to transmit the Wi-Fi signal from a plurality of network transmitters.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. An electronic device to execute a connectionless wireless media content session, the device comprising:
   a radio to receive media content over a wireless channel from a Wi-Fi network;
   memory to store instructions for performing the connectionless wireless media content session to receive the media content without an Internet Protocol (IP) connection to the Wi-Fi network; and
   a controller, coupled to the memory and the radio, to execute the instructions to:
      receive a media access control (MAC) address and encryption keys via one or more communication channels using a uniform resource locator stored in the memory, wherein the MAC address and encryption keys are received using a hypertext transfer protocol (HTTP) or representational state transfer (RESTful) communication with a resource accessed via the uniform resource locator, wherein the one or more communication channels are distinct from the wireless channel;
      monitor the MAC address on the wireless channel for the media content, the media content provided in a packetized data stream over the wireless channel using real-time transport protocol (RTP) over a Wi-Fi MAC layer without an IP connection to the Wi-Fi network;
      use a High-bandwidth Digital Content Protection (HDCP) layer to decrypt the media content from the packetized data stream based on the encryption key; and
      render the media content on the electronic device.

2. The device of claim 1, wherein the media content received over the wireless channel comprises Moving Picture Experts Group transport stream (MPEG2-TS) payloads.

3. The device of claim 2, wherein the packetized data stream includes a MAC header, an RTP header, and a plurality of MPEG2-TS packets.

4. The device of claim 1, wherein the radio is configured to receive the media content from a plurality of network transmitters.

5. The device of claim 1, wherein the controller is further configured to create or maintain an IP connection with the Wi-Fi network for services other than the connectionless wireless media content session.

6. The device of claim 1, further comprising a display and a signal generation device for rendering the media content.

7. A method performed by an electronic device for a connectionless wireless media content session, the method comprising:
   receiving a media access control (MAC) address via a first communication channel, wherein the MAC address is used in a wireless channel of a Wi-Fi network that is distinct from the first communication channel;
   receiving encryption keys via a second communication channel, using a uniform resource locator stored in a memory of the electronic device, wherein the encryption keys are received using a hypertext transfer protocol (HTTP) or representational state transfer (RESTful) communication with a resource accessed via the uniform resource locator, wherein the second communication channel is distinct from the first communication channel, and wherein the second communication channel is distinct from the wireless channel of the Wi-Fi network;
   monitoring the MAC address for received media content over the wireless channel from a transmitter, wherein the received media content is received over a Wi-Fi MAC layer using RTP without an IP connection with the transmitter;
   creating a decrypted media content using a High-bandwidth Digital Content Protection (HDCP) layer to decrypt the media content based on the encryption keys; and
   rendering the decrypted media content on the electronic device.

8. The method of claim 7, wherein receiving the MAC address comprises receiving the MAC address from one of an email, a text message, a preconfigured server address, a Bluetooth channel, a near-field communication (NFC) channel, or scanning of a Quick Response (QR) code.

9. The method of claim 7, further comprising, prior to rendering the received media content:
   generating a packetized data stream from the received media content, wherein the received media content comprises an MPEG2-TS stream;
   generating compressed audio and video signals from the packetized data stream; and
   decompressing the compressed audio and video signals to generate raw audio and video signals for rendering on the electronic device.

10. The method of claim 7, further comprising receiving a MAC header, an RTP header, and a plurality of MPEG2-TS packets.

11. The method of claim 7, further comprising:
   receiving a layered data stream having a plurality of sets of packets; and
   choosing one of the plurality of sets of packets based on the capabilities of the electronic device.

12. The method of claim 7, further comprising:
   receiving a respective data stream from each of a plurality of wireless channels, each channel having a different frequency; and
   decoding one of the respective data streams based on the capabilities of the electronic device.

13. At least one non-transitory device-readable medium comprising instructions for executing a connectionless wireless media content session in an electronic device that, when executed by the electronic device, cause the electronic device to:
   receive a media access control (MAC) address via a first communication channel, wherein the MAC address is used in a wireless channel of a Wi-Fi network that is distinct from the first communication channel;
   receive encryption keys via a second communication channel, using a uniform resource locator stored in a memory of the electronic device, wherein the encryption keys are received using a hypertext transfer protocol (HTTP) or representational state transfer (RESTful) communication with a resource accessed via the uniform resource locator, wherein the second communication channel is distinct from the first communication channel, and wherein the second communication channel is distinct from the wireless channel of the Wi-Fi network;
   monitor the MAC address for received media content over the wireless channel from a network transmitter, wherein the received media content is received over a Wi-Fi MAC layer using RTP without an IP connection with the network transmitter;

create a decrypted media content using a High-bandwidth Digital Content Protection (HDCP) layer to decrypt the media content based on the encryption keys; and render the received media content on the electronic device.

14. The non-transitory device-readable medium of claim 13, wherein the instructions further cause the electronic device to decode packets from a modified data stream based on capabilities of the electronic device, the data stream modified to include sets of data packets, each set targeted for different electronic device capabilities.

15. The non-transitory device-readable medium of claim 13, wherein the instructions further cause the electronic device to monitor one of a plurality of frequencies based on capabilities of the electronic device.

16. The non-transitory device-readable medium of claim 13, wherein the instructions further cause the electronic device to read the MAC address embedded in an email, a text message, or a QR code.

17. The non-transitory device-readable medium of claim 13, wherein the instructions further cause the electronic device to receive the MAC address from an NFC hotspot or a Bluetooth connection.

18. The non-transitory device-readable medium of claim 13, wherein the instructions further cause the electronic device to receive Wi-Fi beacon frames that are transmitted with Delivery Traffic Indication Map (DTIM) messages indicating the availability of multicast traffic at the MAC address.

* * * * *

UNITED STATES PATENT AND TRADEMARK OFFICE
CERTIFICATE OF CORRECTION

Page 1 of 1

PATENT NO. : 10,033,789 B2
APPLICATION NO. : 15/280680
DATED : July 24, 2018
INVENTOR(S) : Bhalla et al.

It is certified that error appears in the above-identified patent and that said Letters Patent is hereby corrected as shown below:

In the Claims

In Column 13, Line 35, in Claim 1, delete "key;" and insert --keys;-- therefor

Signed and Sealed this
Fourth Day of June, 2019

Andrei Iancu
*Director of the United States Patent and Trademark Office*